(No Model.) 4 Sheets—Sheet 2.
W. WATSON.
GRAIN ELEVATOR.
No. 281,214. Patented July 10, 1883.
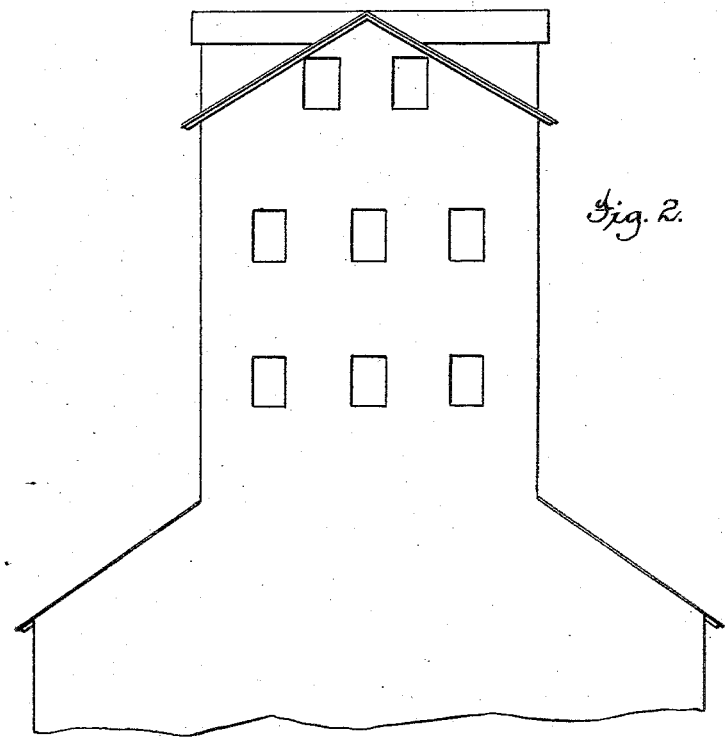
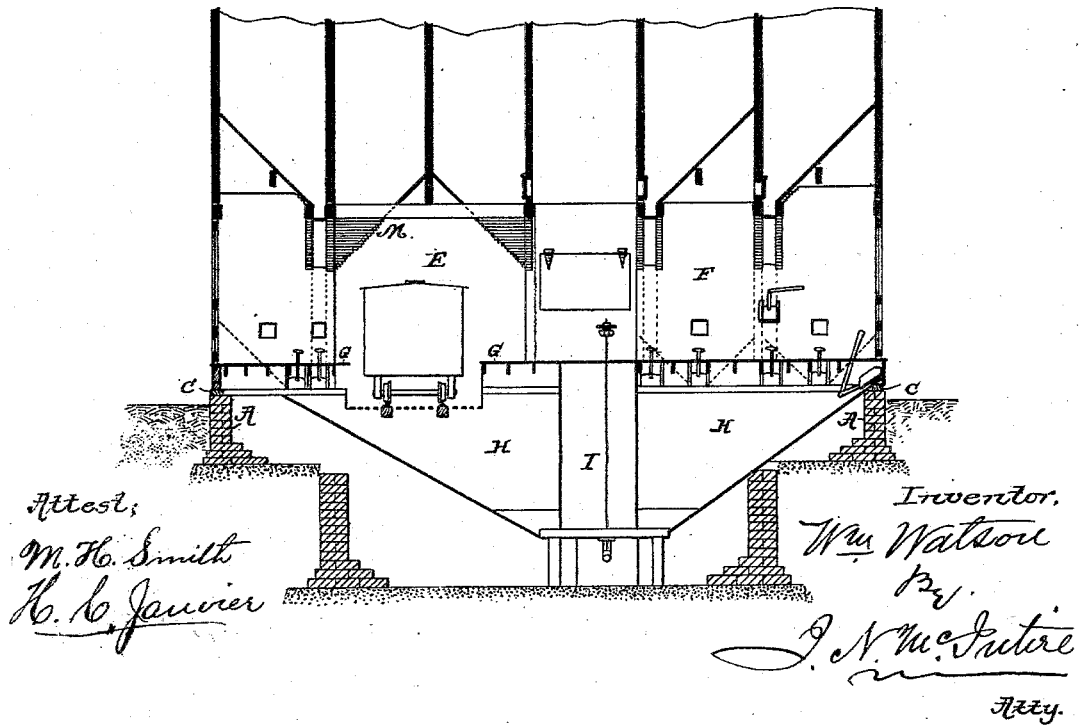

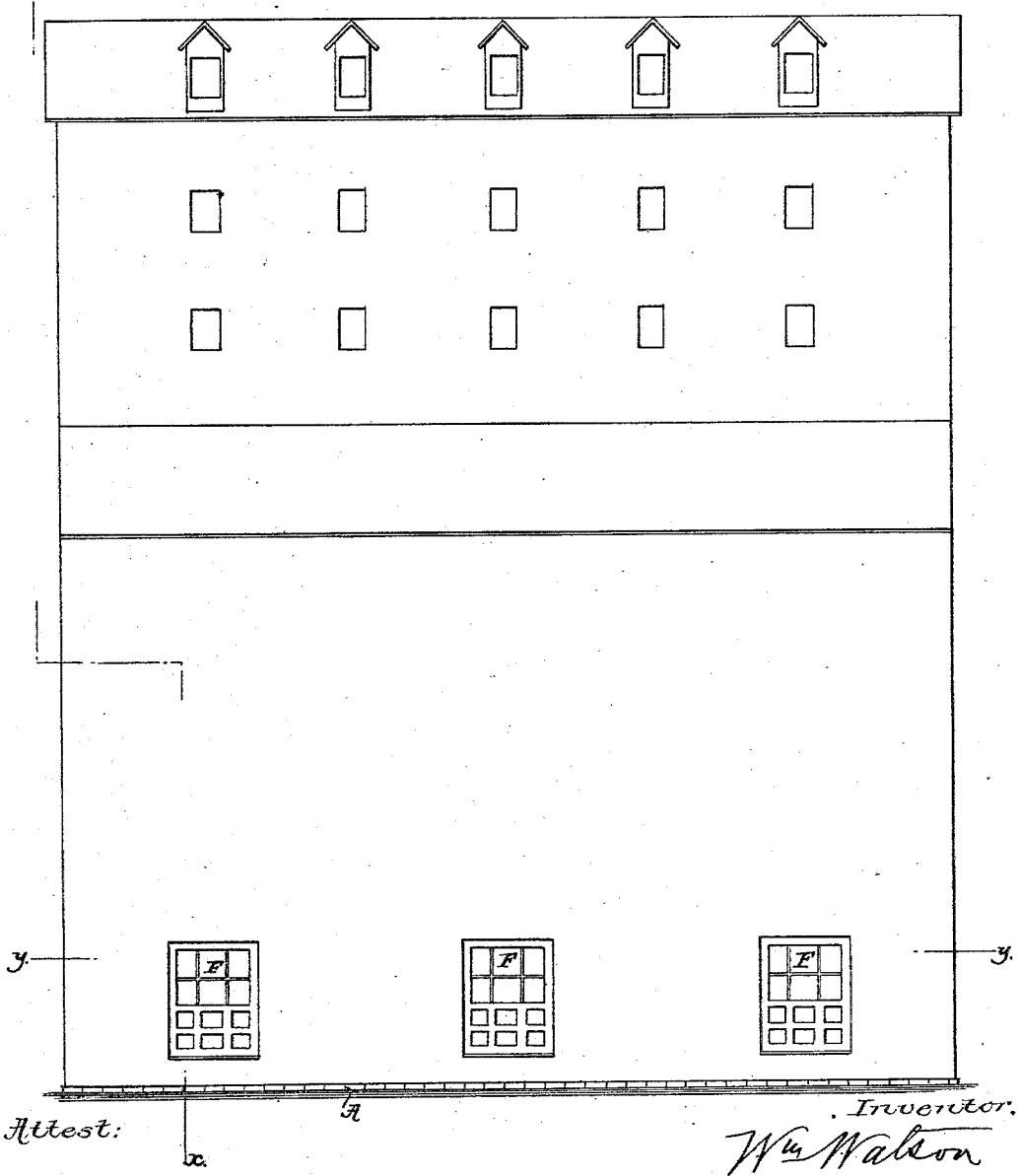

(No Model.)  W. WATSON.  4 Sheets—Sheet 3.
GRAIN ELEVATOR.
No. 281,214.  Patented July 10, 1883.
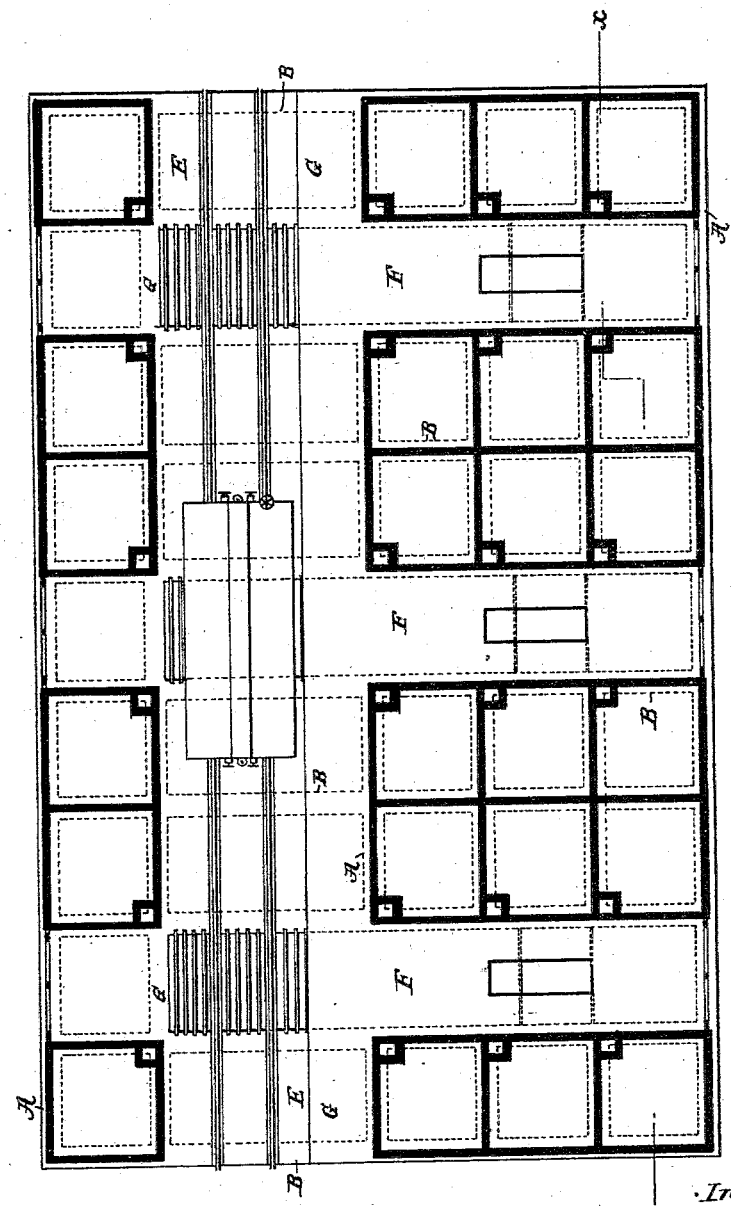
Attest:
M. H. Smith
H. C. Janvier
Inventor,
Wm Watson
By
J. N. McIntire
Atty.

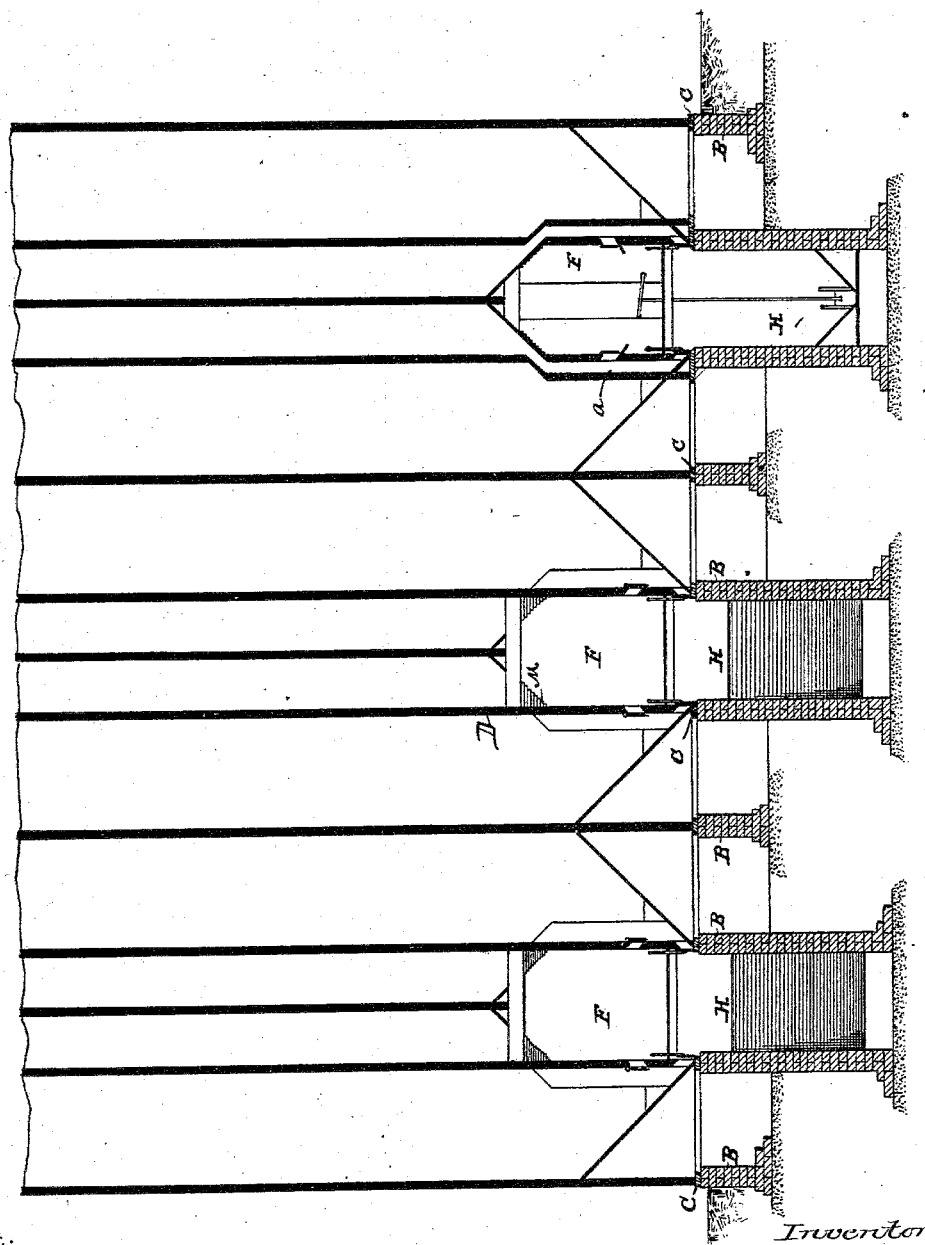

UNITED STATES PATENT OFFICE.

WILLIAM WATSON, OF MEMPHIS, TENNESSEE.

GRAIN-ELEVATOR.

SPECIFICATION forming part of Letters Patent No. 281,214, dated July 10, 1883.

Application filed March 26, 1883. (No model.)

*To all whom it may concern:*

Be it known that I, WILLIAM WATSON, of Memphis, in the county of Shelby and State of Tennessee, have invented certain new and useful Improvements in Grain-Elevators; and I do hereby declare that the following is a full, clear, and exact description thereof, reference being had to the accompanying drawings, making part of this application.

My invention relates to certain new and useful improvements in the construction of grain-elevators, as will be hereinafter more fully explained, and as will be more particularly pointed out and specified in the claims of this application.

To enable those skilled in the art to which my invention appertains to understand and practice the same, I will now proceed to more fully describe the several features of my improvement, referring by letters to the accompanying drawings, in which I have illustrated so much of a grain-elevator as is necessary to be shown for the purpose of explaining my invention, and in which I have shown my said invention carried out in that form in which I have so far practiced it, and which is the best form now known to me.

In the drawings, Figure 1 is an elevation of a grain-elevator made according to my invention. Fig. 2 is a cross-section of the same, but showing only the lower portion. Fig. 3 is a horizontal section at *y y*, Fig. 1. Fig. 4 is a longitudinal section at the line *x x* of Fig. 3.

In the several figures the same parts will be found designated by the same letter of reference.

As is well known to those skilled in the art, the usual manner of constructing grain-elevators is one in which the crib-work composing the bins is supported upon a series of posts, which latter occupy in height about all the space composing what may be properly termed the "first" story of the structure, and one in which also about all the space of the first story (except that occupied by said supporting-posts) has to be used for the accommodation of a system of spouts and spouting necessary in emptying the series of bins of their contents. I propose by one part of my invention to dispense with all of this system of spouts, and at the same time utilize a large portion of the space of the first story of the structure for storage purposes, while at the same time avoiding entirely the use of supporting-posts, and producing a structure more durable and desirable than such as heretofore made, and one in which there will be less liability of uneven settling of the crib-work and less expense in putting up. These desirable ends I accomplish by starting the crib-work in a suitable foundation about at the ground's surface, or about at the level at which it has heretofore been customary to locate the upper surface of the foundational piers for the support of the posts heretofore used to sustain the crib-work.

As heretofore made, the entire superstructure of the grain-elevator has been supported upon a series of piers, which is objectionable because of the concentration of the weight upon numerous separate foundational points of support, and the consequent liability to an uneven settling of the building. I propose by another part of my invention to entirely overcome this objection without enhancing the cost of construction by the employment of a series or net-work of continuous foundation-walls running in lines coincident with those in which have heretofore been arranged the rows of piers.

It has been customary heretofore to form the sinks or receptacles at the base of the building (for the reception of grain to be elevated by the buckets of the elevator-belts) of box or tank like structures, and where there has, from the nature of the soil or the locality of the building, been any liability of the presence and accumulation of water, such receptacles have had to be made of iron to exclude the wet or dampness, which would injure the grain. I propose to avoid the use of any expensive metallic sinks, and at the same time all liability of any injury to the grain from water or moisture, by the formation of the sinks, in which the boots of the elevator-legs rest, between the crossing foundation-walls of the structure, simply concreting the bottoms or floors of the sinks thus formed, where circumstances may render it necessary or expedient to have such receptacles insured against the entrance into them of any moisture.

By another part of my invention I propose to strengthen my novel construction of crib-work and bins by stepping out in bucket-like shape the planking of the crib-work at those localities at which the ends of beams which help to support overhanging bins take their bearings in or are supported by the underlying planking of the crib-work, all of which, together with other parts of my invention, will be found further described hereinafter, and fully illustrated in the drawings forming part of this specification.

A are the longitudinal and B the transverse foundational walls of the structure, which, as seen, intersect each other at numerous points, and the upper surfaces of which are in the same plane and at a height or level about the same as that at which is usually located the plane coincident with the tops of the piers heretofore used. On top of these walls A B are placed the base or sill timbers C, on which rest the courses of the crib-work D of the superstructure, which latter is built up of about the usual material and after the customary manner of forming the crib-work composing the storage receptacles or bins. Contrary, however, to the usual plan, the superstructure of crib-work has certain ones of the bins formed with their bases resting directly on the timbers C of the foundation, while certain others of the bins have their bottoms located at or near the top of the first story, so that, as illustrated, open spaces and passage-ways E and F (running some longitudinally and some transversely of the building) are formed, which are about equal in height to the first story of the house, and which serve for the accommodation of the roadways or tracks and the cars run thereon, for loading and unloading the grain, and to permit free access by the workmen or hands to the lower doors of the bins, and to the valves and all other appliances of the first story of the elevator which need attention and manipulation. G are projecting platforms or extensions of the first floor, for the convenience of the men who have to work the apparatus connected with the discharge-valves of the bins, &c.

H are the sinks into which grain to be elevated is discharged from the unloading cars, and into which is discharged also grain from the various bins for the purposes of mixing, re-elevating, or loading into cars (or other receptacles) for exit from the building, &c.

At Fig. 2 are shown some of the cars in the positions they might occupy in the building, and from this figure and others will be seen the conformation and structure of the sinks, and how the lower ends or boots of the elevating bucketed belts are arranged. These elevating devices I and the boots at the lower ends of the legs are arranged and constructed according to novel plans, which need not be particularized herein, since these and other features of improvement by me in grain-elevators form the particular subjects-matter of other applications for patents by me, in which said features will be found fully explained and illustrated.

It will be seen that by bringing down some of the bins so that their bottoms are nearly or quite level with the tops of the sink-like receptacles in which the lower ends of the elevator-legs are located, and having the rest of the bins communicate at their lower extremities with conduits or vertical passage-ways a, arranged within or at the sides of those bins which run clear down to the first floor, I am enabled, by a system of discharge-valves under the control of the workmen, to discharge the contents of any of the bins directly into the sinks, and thus wholly dispense with the entire system of spouts and spouting usually employed for drawing off the contents of the bins toward any given sink or receptacle. By entirely dispensing with the spouting usually employed, and the consequent saving of the first cost thereof, and the cost of the maintenance, in order, of the same, and all the labor of handling the spouts, I consider one of the greatest advantages resulting from my invention, and one of great importance. Besides the saving in the cost of construction of the elevator and in the expense of running it, all the dust and dirt consequent to the usual system of spouting from the bins are avoided, and the great desideratum is gained of a utilization of a large portion of the first story of the building for storage purposes.

Of course modifications may be made in the construction of my improved building without departing from the novel principles of construction involved, and one or more of the novel features may be employed with comparative advantage without using the whole of my invention. For instance, the number and disposition of the elevator-legs, sinks, and bins may be varied to change the capacity of the elevator, or to adapt it to receive or to discharge grain under different circumstances than those for which the building shown is specially designed, or for both of these purposes. By stepping out the planks of the crib-work as seen at M, a bracket-like support is afforded to the beams extending overhead at the first story, and all the weight supported by said cross-beams is distributed so differently and so much better than is usually the case that there will be much less liability of an uneven settling of the crib-work than in buildings made without this feature of my novel structure.

Having now so fully herein described my invention, in connection with the drawings making part of this specification, that those skilled in the art of building and using grain-elevators can practice my invention, and wishing it to be understood that I do not limit my claims of invention either to any precise details of construction or to the embodiment necessarily in one structure of all the novel points or features of my alleged improvements, what I claim as new, and desire to secure by Letters Patent, is—

1. A grain-elevator having the crib-work started at about the level of the usual first floor, or at about where the supporting-posts heretofore employed had their lower ends supported, and having the crib-work made so that some of the bins have their bottoms elevated above said level, as set forth, whereby the discharge-openings of the bins may be concentrated and all spouting dispensed with, as hereinbefore described.

2. In a grain-elevator, the disposition of the bins formed by the crib-work so as to permit the discharge of their contents from their lower ends directly into the series of sinks, and so as to afford passage-ways in the first story of the building for the accommodation of the cars, and also for the accommodation of the men to work the exit-valves and do other work necessary to be done on the first story of the building.

3. The employment of continuous foundation-walls running both longitudinally and transversely of the building, and adapted to support the walls of the bins formed by the crib-work built directly on said wall, substantially as and for the purposes set forth.

4. The formation of the sinks of an elevator within continuous walls of masonry, (the inclosed spaces between which walls may be concreted to make them impervious to water from the earth, where this may be necessary,) substantially as shown and described.

5. The combination of a series of bins formed by the crib-work, some of which have their bases supported at a level considerably above that of the bases of the others, whereby a series of passage-ways or spaces is formed above the first or ground floor of the building, as and for the purposes described.

6. In the construction of the crib-work, the feature of stepping out the planks or forming bracket-like supports, as described, wherever cross-beams sustaining crib-work that does not rest directly on the foundation-timbers are to be afforded support at their ends, substantially as set forth.

In witness whereof I have hereunto set my hand this 21st day of February, 1883.

WILLIAM WATSON.

In presence of—
 F. P. POSTON,
 TOM HOLEMAN, Jr.